United States Patent [19]

Hodes et al.

[11] Patent Number: 4,623,590

[45] Date of Patent: Nov. 18, 1986

[54] COMPOSITE MATERIAL, ESPECIALLY FOR PLAIN BEARINGS

[75] Inventors: Erich Hodes, Rosbach; Karl-Heinz Wegner, Bad-Schwalbach, both of Fed. Rep. of Germany

[73] Assignee: Glyco-Metall-Werke, Daelen & Loos GmbH, Wiesbaden, Fed. Rep. of Germany

[21] Appl. No.: 673,543

[22] Filed: Nov. 20, 1984

[30] Foreign Application Priority Data

Nov. 30, 1983 [DE] Fed. Rep. of Germany ....... 3343309

[51] Int. Cl.$^4$ ............................................. C08F 45/04
[52] U.S. Cl. .................................. 428/408; 252/12.2; 252/12.4; 252/12.6; 428/908.8
[58] Field of Search .................. 252/12, 12.4, 12.6, 252/12.2; 428/408, 324, 325, 902, 903, 908.8

[56] References Cited

U.S. PATENT DOCUMENTS

| 3,756,982 | 9/1973 | Korshak et al. | 252/12.4 |
| 4,115,283 | 9/1978 | Needham | 252/12.4 |
| 4,360,630 | 11/1982 | Smith | 524/592 |
| 4,421,588 | 12/1983 | Davies | 428/419 |
| 4,540,630 | 9/1985 | Wegner et al. | 428/408 |

Primary Examiner—John E. Kittle
Attorney, Agent, or Firm—Karl F. Ross; Herbert Dubno

[57] ABSTRACT

A composite bearing material for use in plain bearings, i.e., bearings without rolling elements, has a thermoplastic matrix which is reinforced by short fibers having a modulus of elasticity above 50 MPa and can contain friction-reducing particles as well as other fibers.

15 Claims, 6 Drawing Figures

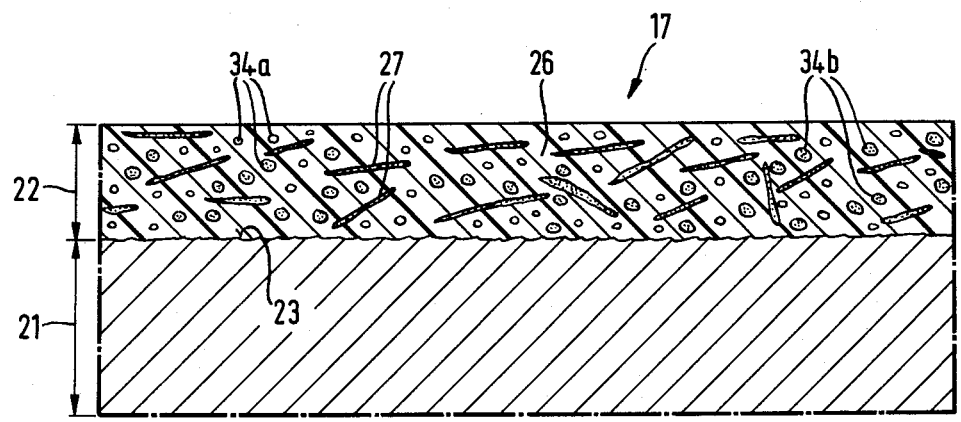
_Fig. 5_
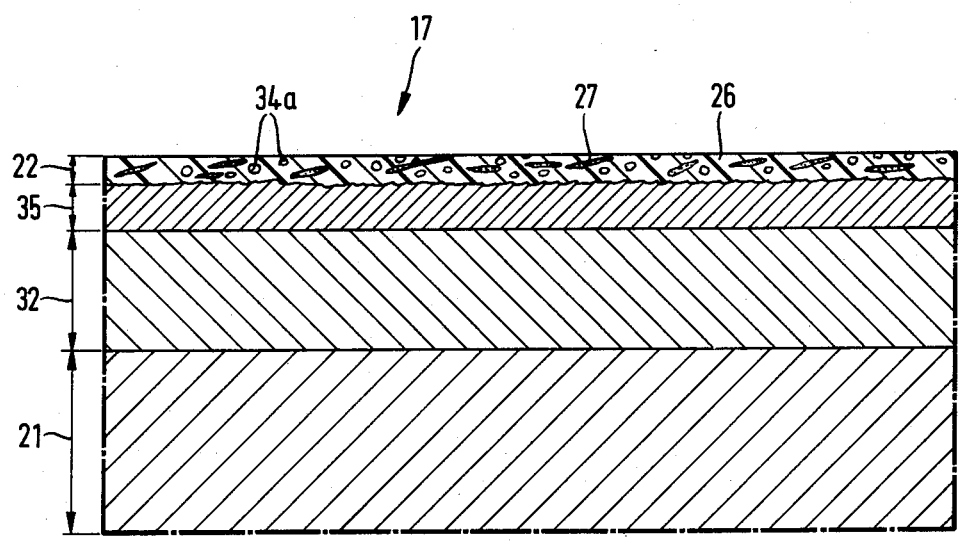
_Fig. 6_

COMPOSITE MATERIAL, ESPECIALLY FOR PLAIN BEARINGS

CROSS REFERENCE TO RELATED APPLICATION

This application is related to the commonly assigned copending application Ser. No. 501,776, filed June 7, 1983, now U.S. Pat. No. 4,540,630, issued Sept. 10, 1985.

FIELD OF THE INVENTION

Our present invention relates to composite materials, especially for use for so-called plain bearings and, more particularly, to metal-backed composite materials having a sliding or friction surface containing reinforcing fibers in a matrix composed of a synthetic resin material and having improved high temperature sliding or friction characteristics.

BACKGROUND OF THE INVENTION

As will be apparent from the aforementioned copending application, a plain bearing is a bearing which has no active element of the roller type, but rather is a member which is interposed between two relatively displaceable elements to contribute a certain friction characteristic to the relative movement thereof.

The most typical use of a plain bearing is a sleeve between two relatively rotating members, the sleeve being affixed to one of these members and having a surface with predetermined friction characteristics engaging the other of these relatively rotatable elements, i.e. a sliding-contact surface.

For instance, the sleeve can be mounted on a shaft and can be rotatably entrained therewith in a bearing housing, in which case the friction surface runs slidingly over a counter surface of this housing. Alternatively, the sleeve may be stationarily fitted in the housing and will have its friction surface slidably engaging the shaft. Other plain bearings can be utilized as thrust bearings, i.e. bearings in which the friction surface lies transversely to the axis of rotation, and even as combined thrust and radial bearings wherein the friction surface can be inclined both to a radius and to the axis of rotation, e.g. can be a conical surface.

The characteristics which such a plain bearing must have will also be apparent from the aforementioned application and one need only point out that normally the friction surface should be distinguished by its long wear, possibly a self-lubricating characteristic, its ability to withstand pressure and heat, its low coefficient of sliding friction and like characteristics. In some cases, less than a maximum antifriction property may be desirable and hence we refer to a predetermined or given friction characteristic of the surface hereof.

In that application, a fiber-reinforced synthetic resin sliding-contact layer is described in which the fiber reinforcement phase consists of short carbon fibers while the matrix is a thermoplastic synthetic resin or a mixture of two or more thermoplastic synthetic resins from the group of polyarylether, polyarylketones, polyarylsulfides, polyarylsulfones and polyaryloxides. To the roughened surface of the metallic carrier or substrate, the reinforcement layer which can include additives for improving or modifying the sliding or friction characteristics are applied, the additives generally being solid lubricant particles with a particle size which is less than or equal to 40 microns.

The composite structure which thus results has been found to be highly effective in providing a firm bond of the sliding-contact layer at the carrier layer, good bonding of the short fibers in the synthetic resin matrix, and many of the advantageous characteristics outlined above.

However, increased temperature resistance, a greater reinforcing effect of the fiber reinforcement and an increased ability of the sliding-contact layer to accommodate friction-modifying additives are nevertheless desirable.

OBJECTS OF THE INVENTION

It is, therefore, the principal object of the present invention to provide an improved composite material which extends the principles described in the aforementioned copending application but which increases the thermal resistance of the sliding-contact layer still further.

Another object of the invention is to provide an improved composite material, especially for plain bearings, in which the sliding-contact layer can accommodate larger quantities of friction-modifying-additives and which allows the composite material to withstand more severe conditions than the earlier composite materials.

SUMMARY OF THE INVENTION

We have now found that when a composite material is fabricated as described in the aforementioned copending application but which also includes in the sliding-contact layer, an effective amount of short reinforcing fibers with a modulus of elasticity of at least 50 MPa as a substitute for or an addition to the carbon short fibers there described, we are able to increase the temperature resistance of the sliding-contact layer significantly while at the same time improving the sliding or friction characteristics thereof at high temperatures. By the use of such fibers whose melting point or softening point or decomposition point lie at temperatures well above 300° C., we are able to increase substantially the high temperature bearing properties. The short fibers which can be utilized for this purpose can be synthetic resins, glasses, natural and synthetic ceramic fibers, metals and metal alloy fibers.

Naturally, this means that, in accordance with the invention, not only carbon short fibers can be used for the fiber reinforcement of the composite materials, but that practically any short fibers may be utilized whose modulus of elasticity at a minimum is 50 MPa and has high temperature resistance and good sliding-friction characteristics.

The following list of fibers is preferred:
Glass fibers with a modulus of elasticity between 75 and 130 MPa.
Graphite fibers with a modulus of elasticity between 700 and 800 MPa.
Metal filaments with a modulus of elasticity between 100 and 450 MPa.
Filaments with hard metal cores and a modulus of elasticity between 350 to 600 MPa.
Synthetic resin fibers with a modulus of elasticity above 50 MPa and especially aromatic polyamides (ARAMID) or polytetrafluoroethylene (TEFLON).
Natural ceramic fibers and synthetic ceramic fibers.
The matrix for the sliding or friction layer can be composed of:
polyethersulfones (PES), polysulfones (PSU),
polyether-etherketones (PEEK), and/or
polyphenylenesulfide (PPS).

The preferred matrix contains and preferably consists of polyether-etherketones (PEEK) and polyethersulfones (PES).

The composite materials of the invention are especially advantageous in the production of semicylindrical and cylindrical plain bearings and the method of the invention can result in the formation of semicylindrical or cylindrical bearing elements without the hitherto unavoidable local variations in thickness of the friction or sliding layer. The composite material with the sliding layer in the desired thickness can be fabricated at the outset and bent into the semicylindrical form or the composite material can be formed in the desired configuration by applying the sliding layer to the support or backing member which can have the desired configuration in the desired but uniform thickness.

This greatly reduces the cost of fabricating sliding bearings, especially semicylindrical sliding bearings to a significant extent.

The multilayer techniques hitherto used and the need to prepare the support by electroplating can be eliminated and the sliding layer may be applied directly to a steel substrate without intervening layers as have hitherto been required in the production of composite materials. For the production of semicylindrical or cylindrical bearings which must be subjected to high demands, we may provide the sliding-contact layer on an intermediate layer which has emergency friction characteristics which may be desirable for the bearing and which is provided upon the metallic substrate. The emergency layer is intended to come into play with wear of the sliding-contact layer down to this intermediate layer and therefore should have friction characteristics corresponding to those desired in the sliding-contact layer.

The intermediate layer can be composed of practically any temperature-resistant material possessing the emergency bearing characteristics desired and generally will be a metallic layer, for example lead bronze or an aluminum alloy. One such aluminum alloy is AlZn-5SiCuPbMg. The thickness of the sliding-contact layer can be between substantially 10 microns and 50 microns and preferably is between 20 and 30 microns. This applies to sliding-contact layers which are applied directly to the metal substrate or to the metallic intermediate layer applied to the substrate for emergency purposes.

According to the invention, moreover, a sliding-contact layer having a thickness between 5 microns and 20 microns and composed of a thermoplastic synthetic resin matrix reinforced with a temperature-resistant fiber reinforcement as described can be applied as an additional sliding-contact layer to a metal-bearing layer which can be, in turn, a two- or more-layer bearing or, alternatively, the metal layers can be applied to this synthetic resin fiber-reinforced layer. In the preferred mode, the additional fiber-reinforced synthetic resin layer can form a starting layer for running in or startup of the bearing, with the main bearing action being applied by the underlying metal layer or layers as the use of the bearing continues.

We have found, most surprisingly, that the composite material bearings of the invention have a sufficiently high temperature resistance so that they can be used in especially high temperature applications. It is therefore a feature of the invention that such bearings are utilized in internal combustion engines and like applications.

BRIEF DESCRIPTION OF THE DRAWING

The above and other objects, features and advantages of the present invention will become more readily apparent from the following description, reference being made to the accompanying drawing in which:

FIG. 5 is a section through the composite bearing of the invention in a third embodiment with an enlargement similar to that of FIGS. 2 and 3; and FIG. 6 is a diagrammatic section illustrating a fourth embodiment of the invention.

SPECIFIC DESCRIPTION

Figure 1:
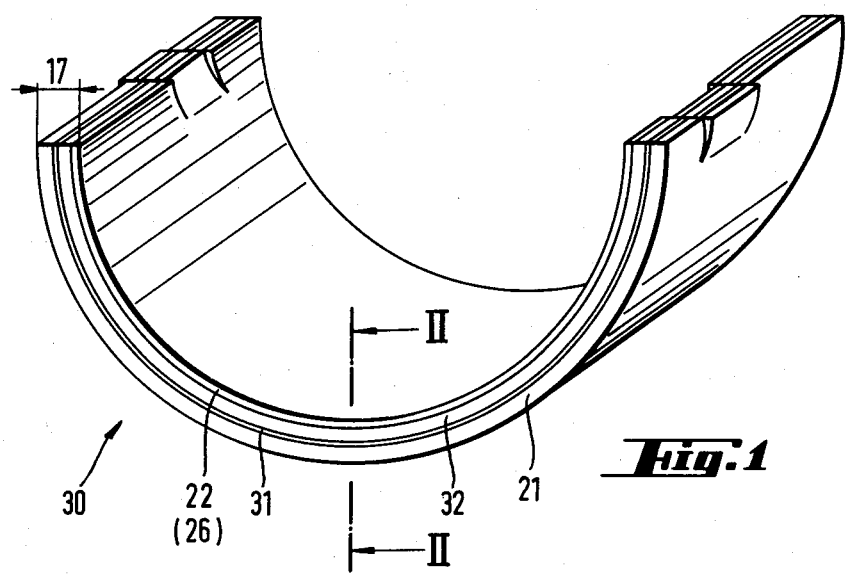
FIG. 1 is a perspective view of a semicylindrical bearing in accordance with the invention for the crankshaft of an internal combustion engine, two such semicylindrical shells being introduced into the bearing housing to journal the crankshaft therein.
Figure 2:
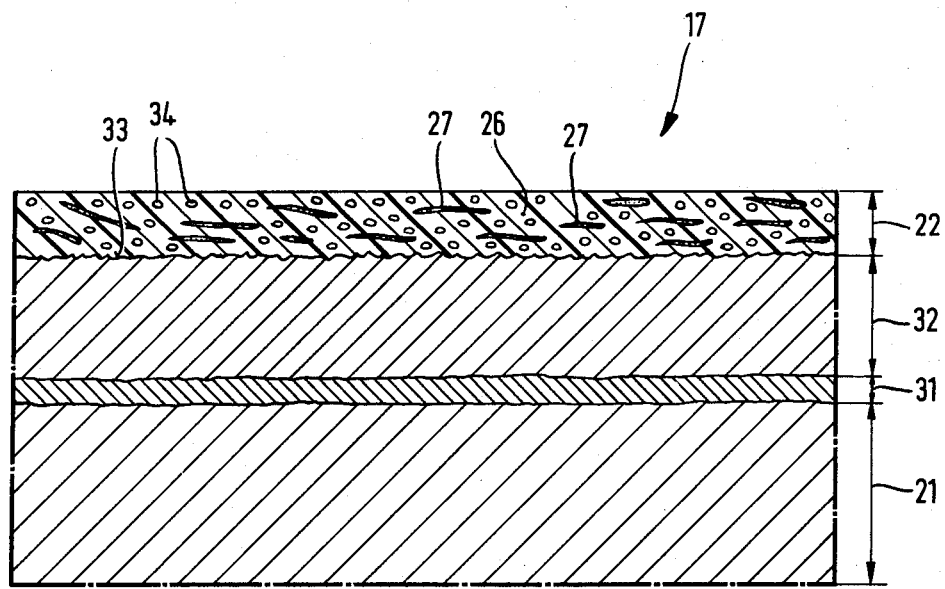
FIG. 2 is a cross-sectional view as taken, for example, along the line II—II in FIG. 1 and showing a portion of the wall of the shell enlarged substantially 100:1 and in highly diagrammatic form.

FIGS. 1 and 2 show a semicylindrical plain bearing 30, i.e. a bearing without rolling elements which comprises a composite laminate 17 formed by rolling and bonding the layers together, and thereafter the bending of the laminate about a mandrel, e.g. by die-pressing to the semicylindrical shape.

The bearing shell thus formed is intended to be interposed between a crankshaft and a bearing housing for an internal combustion engine, the second bearing shell being disposed on the opposite side of the housing.

The bearing comprises a metallic substrate or carrier 21 of steel upon which an intermediate layer 32 of AlZn5SiCuPbMg is applied after application of a base layer 31 of pure aluminum by cladding. The cladding technique can utilize explosive or roll-bonding techniques conventional in the art.

The upper surface 33 of the emergency layer 32 is roughened and receives a sliding bearing or friction layer, hereinafter referred to as the sliding-contact layer 22 in a thickness of 20 microns to 30 microns, this latter layer consisting of a matrix 26 of polyethersulfone (PES). Disposed in this matrix are short fibers 27 and particles 35 of a solid lubricant, the latter being for example polytetrafluoroethylene, graphite or molybdenum disulfide.

The short fibers 27 have a modulus of elasticity of at least 50 MPa and in the example illustrated are graphite fibers with a modulus of elasticity of 700 to 800 MPa. The fibers may have diameters of the order of 1 micron and the fiber length can be between 5 and 40 microns.

Figure 3:
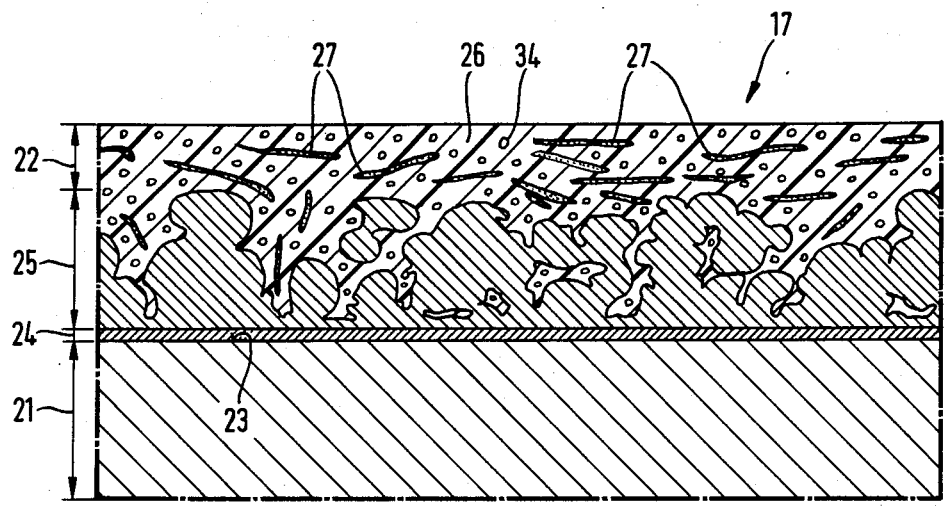
FIG. 3 is an enlarged partial section through a composite-material bearing with a similar enlargement and showing another embodiment of the invention.

In a modification as shown in FIG. 3, the composite material 17 comprises a carrier layer or substrate 21 of steel whose surface 23 carries a thin layer 24 of copper which facilitates bonding of the intermediate layer 25 thereto. The intermediate layer 25 is a rough bearing layer of lead bronze which can be formed by sintering a layer of lead bronze spherical particles to the copper coated surface of the substrate. The rough layer 25 receives the sliding-contact layer 22. In this embodiment and in the previous embodiment, this sliding-contact layer 22 can be applied from a melt of the matrix into which the solid lubricant and the reinforcing fibers have been incorporated. In this embodiment, the matrix 26 consists of polyether-etherketone and penetrates into the interstices of the rough layer 25 while incorporating short fibers 27 with a modulus of elasticity of at least 50 MPa graphite fibers; glass fibers or ceramic fibers are preferred and indeed mixtures of these may be used. Solid lubricant particles 34 are also incorporated into the matrix.

As will be apparent from the following examples, the composite materials whose sliding-contact layers utilize a matrix of thermoplastic synthetic resin, especially polyethersulfone (PES), polysulfones (PSU), polyarylsulfones (PAS) or polyether-etherketone (PEEK) and have a fiber reinforcement of temperature-resistant fibers with a modulus of elasticity of at least 50 MPa, have surprisingly excellent temperature-resistant and corrosion-resistant characteristics in spite of the fact that thermoplastics are used in the matrix and can be utilized effectively in high temperature applications in internal combustion engines.

SPECIFIC EXAMPLES

EXAMPLE 1

1000 g PEEK
200 g graphite short fibers (Sigrafil-P-Staplefiber M-102), and
50 g of particulate graphite (particle size 5 to 20 microns) are intensively mixed in a mixer (Henschel-Mixer, type AM 90 L2) for 10 seconds and the mixture is introduced into a supply vessel from which it is applied by a doctoring blade to a steel strip previously provided with a porous bronze layer (FIG. 3) by sintering. The sliding-contact layer material is melted as the strip passes through a tunnel oven in which it is heated from an inlet temperature of 360° C. to an outlet temperature of 400° C. The speed of the band is 1.2 to 5 m per minute and the normal sliding-contact layer thickness averages 30 microns, has a perfectly smooth upper surface and fills the interstices of the sintered layer therebelow. After cooling, the strip is hot-rolled to its final thickness with a thickness tolerance of ±2 microns.

EXAMPLE 2

100 g PES
70 g graphite short fibers (Sigrafil-P-Staplefiber M-102) and
20 g of particulate graphite (as in FIG. 1) are mixed for 20 seconds and fed to a supply vessel from which the mixture is doctored onto a steel strip which has previously been laminated with AlZn5SiCuPbMg (FIG. 2). The end thickness of the sliding contact layer was held at 30 microns ±2 microns. In an electrically heated tunnel oven, the plastic mixture was melted with an inlet temperature of 400° C. and upon leaving the tunnel oven the strip was cooled by a spray of water onto the underside of the strip to a temperature of 80° C. and was thereupon coiled.

In both cases bearings for use in internal combustion engines were made and found to be effective.

The corrosion tests were made on three bearing shells with the examples given, each having the steel substrate, the intermediate layer of AlZn5SiCuPbMg and the sliding contact layer with the synthetic matrix in which the carbon fibers and graphite particles are embedded. A comparative test was made utilizing PPS as the control. Each of the samples was introduced into a 250-ml beaker and coated with a lubricant (Shell Rotella X HD 30). The test vessel was heated on a heating plate for a period of 168 hours at a temperature of 150° C.±2° C. The samples were then degreased with perchlorethylene and the surfaces of the sliding contact layer studied by a stereomicroscope.

Significant weight loss was found only with the bearings having the PPS matrix for the sliding-contact layer.

Figure 4:
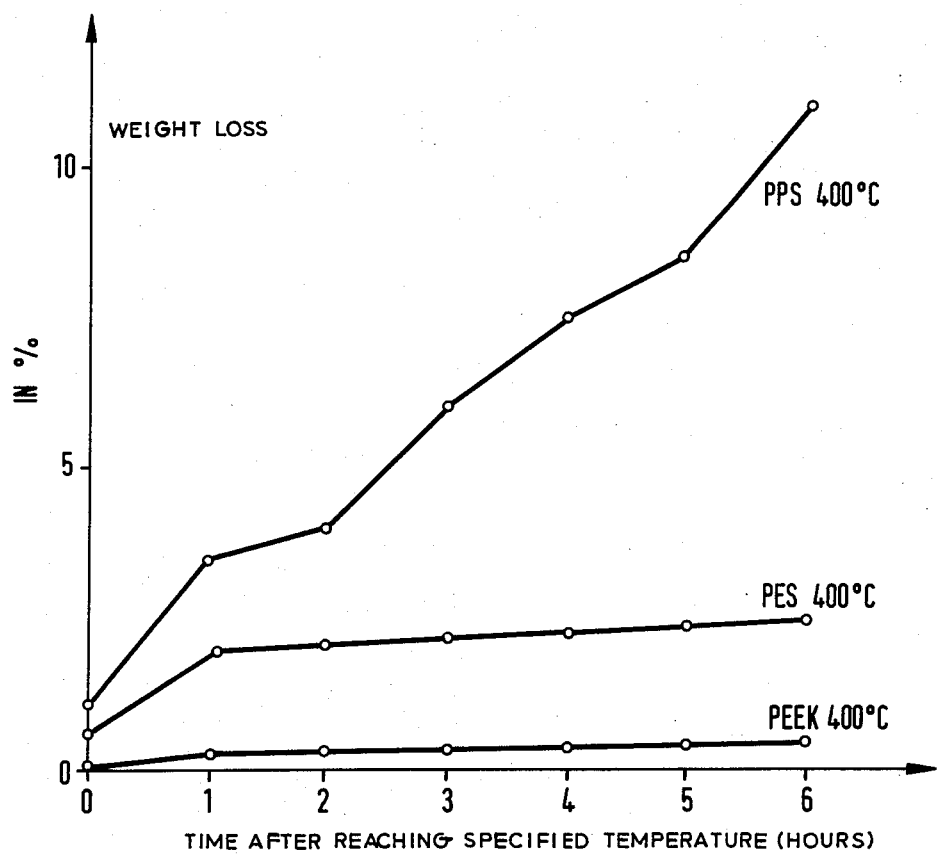
FIG. 4 is a thermogravimetric diagram for the composite material of the invention illustrating the characteristics of the sliding-contact layer utilizing PPS, PES and PEEK matrices.

FIG. 4 diagrams the values obtained in the thermogravimetric tests for bearings with materials of PES and PEEK by comparison with PPS. The clear superiority of PES and PEEK over bearings with PPS in the contact layer is evident.

A further embodiment of the composite material is shown in FIG. 5 at 17. Here the sliding-contact layer 22 is applied directly to the mechanically roughened or mechanically edged surface 23 of the steel substrate 21. The matrix 26 of the sliding-contact layer 22 in this example is formed from polyether-etherketone (PEEK). Short fibers 27 are graphite with a modulus of elasticity of 700 to 800 MPa, and graphite particles 34a and polytetrafluoroethylene particles 34b are incorporated in this matrix.

In the embodiment of FIG. 6, the substrate 21 is composed of steel and has an intermediate layer 32 with at least emergency bearing characteristics and in the form of a metal bearing alloy. Upon the latter, we apply a main bearing layer 35 of a metallic bearing material and upon the latter a second or outer bearing layer 22 of the thermoplastic matrix containing the short fibers and lubricant particles according to the invention.

The intermediate layer 32 can be composed of any bearing material. For example the aluminum bearing alloy of FIG. 2 and in this case the bonding layer can be provided between the substrate 21 and the intermediate layer as has also been illustrated in FIG. 2. This bonding layer can be pure aluminum.

The lower or main bearing layer 35 can be composed of any conventional bearing material such as an aluminum-lead suspension alloy which can be deposited on the intermediate layer 32 by melt spraying or any other appropriate process. On the surface of the main bearing layer, the outer layer 22 which can have the composition of Example 2 can be applied, the graphite fibers of this composition being replaced by carbon fibers 27 also in a short fiber state and with a modulus of elasticity between 50 MPa and 200 MPa. The graphite particles 34a are also incorporated in the PEEK matrix 26.

Table 1 shows the various matrix phases which are used, $T_g$ representing the glass transition temperature which, in addition to the melting point $T_m$, is also important for the purposes of the invention. The glass partition temperature is important because when it is exceeded in the operation of the bearing of the invention, adhesive wear can occur since the matrix assumes a doughy consistency and under load can be plastically deformed to a significant extent.

Table 1 shows that polyphenylenesulfide (PPS) has a comparatively low glass transition temperature $T_g$ of 88° C. so that it is not a suitable matrix material when the composite is to be subjected to temperatures higher than 70° to 80° C.

The particles which are added to modify the friction characteristics, i.e. the solid lubricants, should have a particle size no greater than 40 microns.

When the short fibers which are used are of the hard metal core type, the hard metal of the core is preferably tungsten. The metal fibers which are used for reinforcement can make up between 5 and 40% by weight of the composition whereas the particles which contribute a friction-reducing effect can be present in amounts ranging between substantially 1 and 20% by weight thereon.

The preferred natural ceramic fibers are chrysotile, crocidolite, anthrophyllite tremolite and amosite, and the preferred synthetic ceramic fibers are those based on borides, carbides, nitrides, oxides, silicides and silicates.

TABLE 1

| Synthetic raw material | $T_g$ °C. | $T_m$ °C. | Degree of crystallization |
|---|---|---|---|
| Polyethersulfone (PES) | 230 | 365 | 55 |
| Polysulfone (PSU) | 190 | 343 | — |
| Polyarylsulfone (PAS) | 288 | — | — |
| Polyether-etherketone (PEEK) | 143 | 334 | 48 |
| FOR COMPARISON: | | | |
| Polyphenylenesulfide (PPS) | 88 | 188 | 60 |

TABLE 2

As fiber materials can be used:

| Fiber material | Modulus of elasticity MPa | Conductivity $\frac{W}{m \cdot K}$ | Specific heat $\frac{1}{g \cdot K}$ | Melting temperature (Decomposition temperature (°C.) |
|---|---|---|---|---|
| Carbon staple | 50–150 | 15 to 100 | 0.7 | 3.600 |
| Graphite fiber | 700–800 | 81 to 404 | 0.8 | 3.500 sublimation point |
| Polytetrafluoroethylene | | 0.23 | 1.0 | 327 |
| Aramid | | | | |
| Metal filaments | 100–450 | | | |
| Filaments with hard metal core | 350–600 | | | |
| Glass fibers | 75–130 | 0.8 | 0.7–0.8 | — |
| Ceramic fibers | | | 0.3–3 | — |

We claim:

1. A composite antifriction bearing for use in internal combustion engines comprising:
   a metal support; and
   an antifriction sliding-contact layer on and bonded to said support and comprising:
   a synthetic resin thermoplastic matrix of polyether sulfone,
   short reinforcing thermally refractory fibers distributing uniformly in said matrix and having a modulus of elasticity of at least 50 MPa, and
   solid lubricants and other fibers, said short fibers having good sliding characteristics and melting point, softening point and decomposition point temperatures above 300° C. and being selected from the group which consists of synthetic resin fibers, glass fibers, natural fibers, metal and metal alloy fibers, and carbon fibers.

2. The composite antifriction bearing defined in claim 1 wherein said short fibers are glass fibers with a modulus of elasticity between 75 MPa and 130 MPa.

3. The composite antifriction bearing defined in claim 1 wherein said short fibers are graphite fibers with a modulus of elasticity between 700 MPa and 800 MPa.

4. The composite antifriction bearing defined in claim 1 wherein said short fibers are metal filaments, having a modulus of elasticity between 100 MPa and 450 MPa.

5. The composite antifriction bearing defined in claim 1 wherein said short fibers are filaments with a hard metal core having a modulus of elasticity of 350 MPa to 600 MPa.

6. The composite antifriction bearing defined in claim 5 wherein said hard metal core is composed of tungsten.

7. The composite antifriction bearing defined in claim 1 wherein said short fibers include natural ceramic fibers selected from the group which consists of chrysotile, crocidolite, anthrophyllite, tremolite and amosite.

8. The composite antifriction bearing defined in claim 1 wherein said short fibers are synthetic ceramic fibers of boride, carbide, nitride, oxide, silicide and silicate base.

9. The composite antifriction bearing defined in claim 1 wherein said antifriction layer is applied directly to said substrate.

10. The composite antifriction bearing defined in claim 1 wherein said substrate is provided with an intermediate layer having at least emergency bearing characteristics and said sliding-contact layer is applied to said intermediate layer.

11. The composite antifriction bearing defined in claim 10 wherein said intermediate layer is AlZnSiCuPbMg and said short fibers are carbon staple fibers.

12. The composite antifriction bearing defined in claim 1 wherein said antifriction layer has a thickness between 10 and 50 microns.

13. The composite antifriction bearing defined in claim 12 wherein said thickness is between 20 and 30 microns.

14. The composite bearing defined in claim 1 wherein a metal bearing layer is disposed between said antifriction layer and said substrate.

15. The composite bearing defined in claim 1 wherein said antifriction contains as solid lubricants molybdenum disulfide, graphite or polytetrafluoroethylene particles to improve the antifriction properties thereof.

* * * * *